(12) United States Patent
Day, Jr.

(10) Patent No.: US 6,854,453 B1
(45) Date of Patent: Feb. 15, 2005

(54) POSITIVE PRESSURE VAPOR FUEL INJECTION SYSTEM

(76) Inventor: Joseph Day, Jr., 3104 N. Rutherford, Chicago, IL (US) 60634

( * ) Notice: Subject to any disclaimer, the term of this patent is extended or adjusted under 35 U.S.C. 154(b) by 0 days.

(21) Appl. No.: 10/722,824

(22) Filed: Nov. 26, 2003

(51) Int. Cl.7 ................................................ F02M 31/00
(52) U.S. Cl. ........................................................ 123/543
(58) Field of Search ................................. 123/543–557, 123/296, 431, 507

(56) References Cited

U.S. PATENT DOCUMENTS

| | | | |
|---|---|---|---|
| 1,799,397 A | * 4/1931 | Taylor et al. | ................ 123/431 |
| 3,886,919 A | 6/1975 | Freeman | |
| 3,960,121 A | 6/1976 | Backus | |
| 3,974,802 A | 8/1976 | Lundquist | |
| 4,015,569 A | 4/1977 | Leshner et al. | |
| 4,058,091 A | * 11/1977 | Tanahashi | .................... 123/261 |
| 4,149,497 A | 4/1979 | Zeliszkewycz | |
| 4,188,928 A | 2/1980 | Faustinos | |
| 4,300,514 A | * 11/1981 | Schaich | ....................... 123/557 |
| 4,408,574 A | 10/1983 | Schaich | |
| 4,445,485 A | 5/1984 | Chamness, Jr. | |
| 5,103,645 A | 4/1992 | Haring | |
| 5,291,870 A | 3/1994 | Covey, Jr. | |
| 5,394,838 A | 3/1995 | Chandler | |
| 5,408,973 A | 4/1995 | Spangjer | |
| 5,957,106 A | * 9/1999 | Maloney et al. | ............ 123/296 |

OTHER PUBLICATIONS

Two slected pages from Orbital Engine Corp. website printed on Jun. 12, 2003 depicting and describing Orbital Engine Corp. Air–Assisted Fuel Injection System.

* cited by examiner

Primary Examiner—Marguerite McMahon

(57) ABSTRACT

A vapor fuel injection system including an air pump having dedicated air cylinders assigned to individual engine cylinders and adapted to produce timed charges of pre-heated air adapted to push timed charges of fuel through a heat exchanger where the timed charges of fuel are converted into metered charges of fuel vapor. The charges of fuel vapor are subsequently pushed into and through fuel vapor delivery nozzles defined in the respective guide bodies of respective intake valve assemblies. After exiting the guide body of said valve assemblies, the timed charges of fuel vapor mix with intake manifold air and then are fed directly into the engine cylinders for combustion.

17 Claims, 2 Drawing Sheets

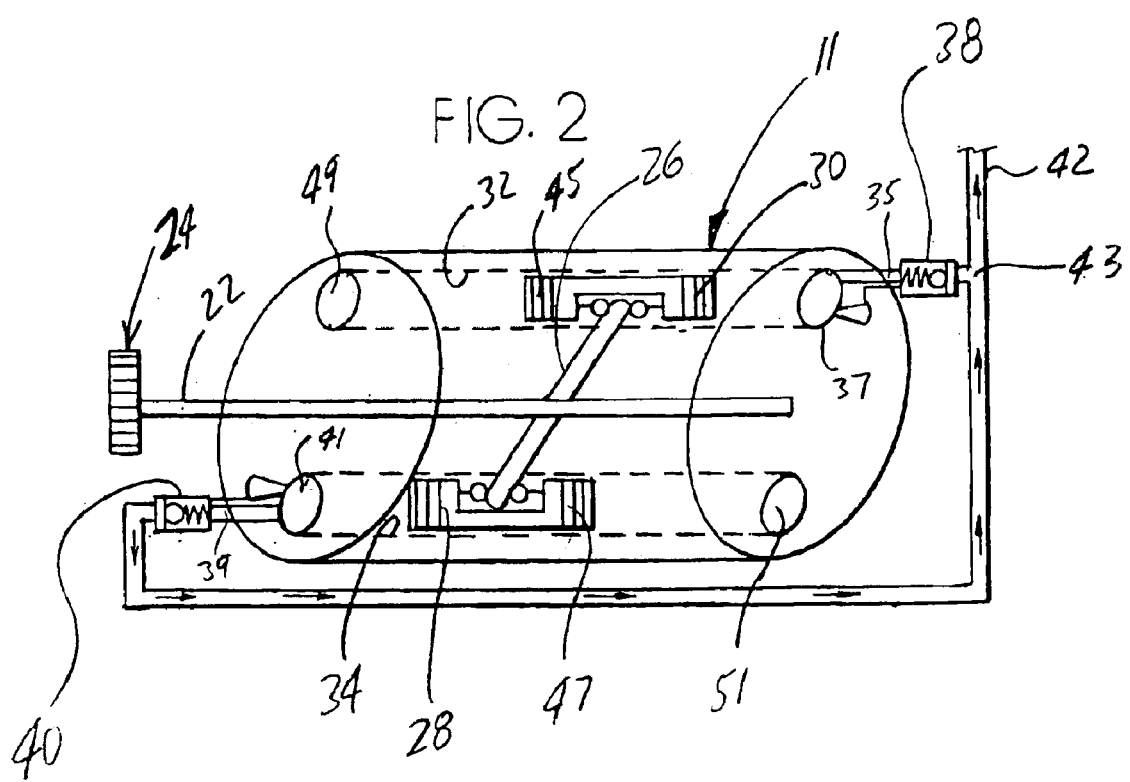

POSITIVE PRESSURE VAPOR FUEL INJECTION SYSTEM

FIELD OF THE INVENTION

This invention relates generally to a fuel injection system for injection of a vaporizing fuel such as, for example, gasoline or alcohol and, more particularly, to a system which utilizes a multi-cylindered air pump in combination with fuel injectors and heat exchangers for delivering metered and timed charges of fuel vapor into the respective cylinders of an internal combustion engine.

BACKGROUND OF THE INVENTION

Increasing the efficiency of internal combustion engines has been a continuous endeavor. One of the ways in which efficiency has sought to be increased is through the combustion of vaporized rather than liquid fuels.

Although systems have been developed over the years in which combustion is attained using fuel vapors, there remains a need for a fuel vapor delivery system which is simple in structure, efficient and easily adaptable into existing engine systems. The system of the present invention fills these needs.

SUMMARY OF THE INVENTION

The invention relates to a vapor fuel injection system adapted for delivering timed charges of fuel vapor into an engine including a plurality of cylinders. The system initially comprises a plurality of fuel injectors operatively associated with the plurality of engine cylinders respectively and adapted to emit timed charges of fuel. The system further comprises an air pump including a plurality of air cylinders operatively dedicated to the plurality of fuel injectors and the plurality of engine cylinders respectively and adapted to produce timed charges of air. Still further, the system comprises a plurality of air delivery conduits extending between the air cylinders and fuel injectors respectively, the conduits being sized and adapted to increase the velocity and temperature of the air flowing therethrough. Moreover, a plurality of heat exchange conduits are operatively associated with the plurality of fuel injectors respectively and the timed charges of air are adapted to push the respective timed charges of fuel into and through the heat exchange conduits respectively wherein the timed charges of fuel are converted into timed charges of fuel vapor.

Still further, a plurality of vapor delivery nozzles are operatively associated at one end with the plurality of heat exchange conduits respectively and at the other end with the plurality of engine cylinders respectively. Each of the vapor delivery nozzles are preferably, although not necessarily, formed in the bodies of the respective intake valve guides. A control relief valve operatively associated with each of the heat exchange conduits controls the pressure of the timed charges of fuel vapor. Finally, an air intake manifold is operatively associated with the engine cylinders and is adapted to deliver throttled charges of intake air into the engine cylinders respectively. The vapor delivery nozzles and air intake port are positioned and oriented relative to one another in a manner whereby the timed charges of fuel vapor and intake air are mixed together at the point of entry into the respective engine cylinders.

BRIEF DESCRIPTION OF THE DRAWINGS

In the accompanying drawings which form part of the specification in which like numerals are employed to designate like parts throughout the same:

FIG. 2 is a simplified side view of the multi-cylindered air pump of the positive pressure vapor fuel injection system of the present invention.

DETAILED DESCRIPTION OF THE PREFERRED EMBODIMENTS

Figure 1:
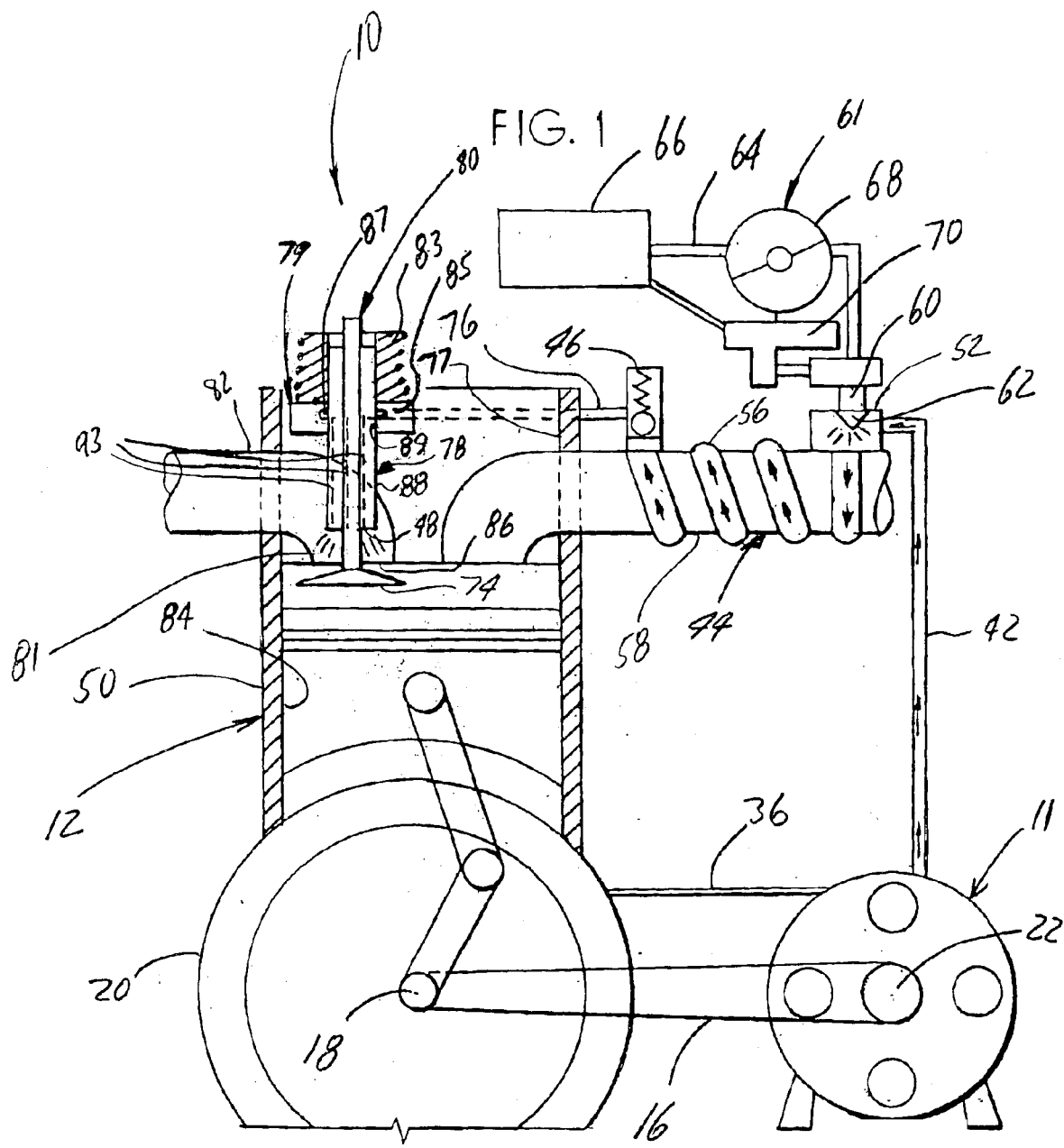
FIG. 1 is a simplified, schematic view of the positive pressure vapor fuel injection system of the present invention.

The invention disclosed herein is, of course, susceptible of embodiment in many different forms. Shown in the drawings and described herein below in detail is a preferred embodiment of the vapor fuel injection system of the present invention. It is to be understood, however, that the present disclosure is an exemplification of the principles of the invention and does not limit the invention to the illustrated embodiment.

A positive pressure vapor fuel injection system embodying the principles of the present invention is depicted in a schematic, simplified manner in FIGS. 1 and 2. Specifically, it is understood that FIGS. 1 and 2 depict only a portion of the system of the present invention and, more particularly, the relationship and cooperation between the various elements of the positive pressure vapor fuel injection system of the present invention and only one of the cylinders of, for example, a four cylinder, four-cycle internal combustion engine. Although not shown in any of the FIGURES, it is understood that the various elements of the positive pressure vapor fuel injection system are adapted to be duplicated for each of the other engine cylinders in a similar manner.

Referring to FIGS. 1 and 2, positive pressure vapor fuel injection system 10 initially comprises a multi-cylinder swash plate type air pump 11 which is adapted to be timed to engine 12 alternatively using either gear 24 (FIG. 2) or a toothed endless timing belt 16 (FIG. 1). As shown in FIG. 1, one end of the belt 16 is adapted to surround the shaft 18 of flywheel 20 while the other end of the timing belt 16 is adapted to surround a shaft 22 which is operatively associated with air pump 11. As shown in FIG. 2, timing belt 16 may be appropriately substituted with gear 24 which, although not shown, is adapted to cooperate with the shaft 18 of engine flywheel 20. In the embodiment of FIG. 1, engine shaft 18 is preferably half the diameter of air pump shaft 22 so that air pump 11 operates and rotates at half the speed of engine shaft 18. Similarly, in the embodiment of FIG. 2 where gear 24 is operatively associated with pump 11, the diameter of gear 24 is preferably twice the diameter of engine shaft 18 to effect the same half speed relationship between the engine 12 and pump 11. Thus, the system of the present invention is adapted to complete one full positive pressure vapor fuel injection cycle for each full revolution of gear 24 while one complete power stroke cycle of the engine 12 is effected for two revolutions of crank shaft 18.

Although not shown or described in any great detail, it is understood that the timing belt 16 (in the embodiment of FIG. 1) and the gear 24 (in the embodiment of FIG. 2) are both adapted to impart a rotary motion to air pump shaft 22 which, in turn, is adapted to impart a back and forth motion to a swash plate 26 operatively associated therewith. Air pump pistons 28 and 30 extend from the respective opposite ends of the plate 26. Pistons 28 and 30, in turn, are adapted for back and forth longitudinal linear movement within the interior longitudinal cavities of respective upper and lower air pump piston cylinders 32 and 34 in response to the back and forth movement of plate 26 within the interior of pump 11.

In accordance with the invention, and although FIG. 2 depicts only two of the pistons 28 and 30 and two of the piston cylinders 32 and 34, it is understood that the pump 11 is adapted to incorporate between one to two piston cylinders per engine cylinder. Thus, in the embodiment where the system 11 is adapted for use in connection with a four cylinder engine, there could be anywhere between four to eight piston and associated cylinders located within the interior of pump 11. Stated another way, the system and components of the present invention would be duplicated four fold for a four cylinder engine.

An oil supply conduit 36 (FIG. 1) is adapted to extend between pump 11 and engine 12. Alternatively, and although not shown, it is understood that the air pump 11 could incorporate its own oil pump.

In accordance with the present invention, air compressed by piston 30 is directed into and through a first conduit 35 operably coupled to one end 37 of the cylinder 32 while air compressed by the piston 28 is directed through a second conduit 39 operably coupled to one end 41 of the cylinder 34. Conduits 35 and 39 are thereafter joined together at junction 43 and the combined stream of air flowing through conduits 35 and 39 is transferred into conduit 42.

Although not shown or described in any detail, it is understood that air compressed by pistons 45 and 47 would be directed to conduits (not shown) which would be operatively coupled to the opposite ends 49 and 51 of cylinders 32 and 34 respectively. These two conduits, in turn, would be operatively coupled to another conduit similar to conduit 42 which would, in turn, be operatively associated with another air/fuel mixing chamber and heat exchanger similar in structure and relationship to air/fuel mixing chamber 52 and heat exchanger 44. It is further understood that pump 11 would need to incorporate four additional air pump cylinders where the system of the present invention is used with a four cylinder engine. Alternatively, another pump of the type shown in FIGS. 1 and 2 could simply be added to the system.

Air pump 11 additionally incorporates valves 38 and 40 which are operatively associated with air pump conduits 35 and 39 respectively and adapted for controlling, and where necessary relieving, the pressure of the output air generated by the pump 11. Although not shown, it is understood that pump 11 is also adapted to incorporate check valves and inlet filter pipes of the type known to those of ordinary skill in the art.

As briefly discussed above, pistons 28 and 30 are configured to compress air for engine cylinder 50 provided engine 12 is adapted to fire the standard one cylinder at a time. Other internal combustion engine designs such as, for example, opposed cylinder designs which are adapted to fire two cylinders at a time could, of course, incorporate an appropriately modified embodiment of the air pump 11.

In accordance with the present invention, pump 11 is sized in a manner corresponding and proportional to the internal volume capacity of air supply conduit 42 and the associated system hardware such as, for example, heat exchanger 44, control relief valve 46, and intake valve guide injection nozzles 48 so as to allow and effectuate a complete and efficient exchange or transfer of air into system 10 following each of the strokes of pistons 28 and 30 of pump 11. It is further understood that the internal volume capacity of conduit 42 is such that a restricted passage is defined which, as result of friction, advantageously raises the temperature of the air traveling therethrough.

Although not shown or discussed in any detail, it is understood that pump 11 is adapted to be appropriately timed in a manner consistent to allow a full charge of compressed air to be properly injected into engine cylinder 50 during the intake stroke of the engine cycle.

Restricted volume air supply conduit 42 is adapted to extend between the outlet of air pump 11 and the inlet of an air/fuel mixing chamber 52 operatively associated with heat exchanger 44. In the embodiment of the system 10 depicted in FIG. 1, heat exchanger 44 comprises a length of steel or the like tubing 56 extending out of the outlet side of mixing chamber 52 and wrapped around the exterior surface of engine exhaust pipe 58.

System 10 also encompasses and incorporates the use of a fuel delivery system 61 comprising initially of a fuel injector 60 including a fuel injector port 62 adapted to extend and protrude into the interior of the air/fuel mixing chamber 52. Although the invention envisions the use of a fuel injector of the common port injection automotive style, it is understood that the invention encompasses and envisions the use of all other suitable fuel injectors known in the art.

A conduit 64 connects the fuel injector 60 to a fuel tank 66. A fuel pump 68 is disposed along conduit 64 between fuel tank 66 and fuel injector 60. An engine control module (ECM) 70, together with its associated hardware, throttle valve assembly and sensors, is adapted to control the operation of fuel injector 60 and fuel pump 68.

In accordance with the present invention, air pump 11 pumps air which is carried and delivered into the fuel mixing chamber 52 via conduit 42. In the chamber 52, the air mixes with the liquid fuel charge emitted from the fuel injector 60 and subsequently pushes the fuel through the tortuous heat exchange conduit or tubing 56 where the air/fuel mixture is heated to a temperature in excess of 400 degrees (the temperature required to permanently vaporize fuel) and subsequently progressively and increasingly converted into a vapor. In accordance with the present invention, the pre-heating of the air as a result of the travel thereof through conduit 42 assures complete vaporization of the air/fuel mixture in heat exchange conduit 56.

In accordance with the present invention, the timing of the fuel charges can be started early so as to allow increased vaporization time in the heat exchanger. The timing of the fuel charges is also adapted to coincide and correspond with the air pump's draw of additional air at the start of a new positive pressure vapor fuel injection cycle. Moreover, it is understood that each of the dedicated pistons of air pump 11 are adapted to deliver a timed and metered burst of pre-heated air on an individual basis to each of the fuel injectors respectively and, in turn, the pump 11 is adapted to deliver said set charges of fuel emitted from said respective fuel injectors in a timed relationship through respective heat exchangers and then through respective individual vapor delivery nozzles 48. The presence of pre-heated air also shortens the time necessary for the effective operation of the heat exchanger following the start of the engine.

Relief valve 46 is operatively associated with and connected to the outlet end of the heat exchange conduit 56. In accordance with the invention, relief valve 46 is adapted to be set at a relief pressure allowing the respective fuel injection charges to be timed approximately to the respective opening of the engine intake valve 74. From relief valve 46, the air/fuel vapor mixture travels through conduit 76, through the interior of the cylinder head cavity 77, and then into and through the engine intake valve guide body 78 of fuel intake valve 74.

Particularly, and as shown in FIG. 1, a fuel vapor delivery collar 79 is adapted to surround the outer circumferential surface 88 of the intake valve guide body or sleeve 78 at a location thereon generally adjacent a mid-point thereof below the spring 83 associated therewith. In accordance with the present invention, collar 79 defines a first bore 85 (shown in phantom) extending radially inwardly into the body thereof from the outer radial surface thereof. Conduit 76 is adapted to extend into the collar 79 and, more particularly, is adapted to extend into vapor flow communication with the bore 85 thereon.

Collar 79 additionally includes a circumferential groove 87 defining a vapor fuel transfer passage extending inwardly into the body thereof from the inner circumferential surface 89 thereof which surrounds and abuts the outer peripheral surface 88 of the valve guide body 78. In turn, guide body 78 defines a plurality of longitudinal vapor fuel passages or bores 93 (shown in phantom) extending between the groove 87 in collar 79 and terminating in the distal radial end face of valve guide body 78 wherein said vapor fuel passages 93 define said plurality of vapor delivery nozzles 48. Passages 93 span around the circumference of guide body 78 in spaced apart and parallel relationship and in vapor flow communication with circumferential groove 87 defined in collar 79.

In accordance with the present invention, conduit 76 is in vapor flow communication with bore 85 in collar 79 which, in turn, is in vapor flow communication with fuel vapor groove or passage 87 which, in turn, is in vapor flow communication with, and is adapted to transfer the vaporized air/fuel mixture into, the plurality of vapor fuel passages 93 defined in the valve guide body 78.

An intake air manifold 82, which is normally associated with the cylinder head intake port of engine 12, is operatively associated with engine intake valve assembly 80 and adapted to introduce air into the engine cylinder 50 in response to the timed opening of intake valve 74. Moreover, and in accordance with the present invention, injection of the vaporized air/fuel mixture introduced through the guide body 78 of intake valve assembly 80 is adapted to occur in response to the opening of the control relief valve 46 which, in turn, is adapted to occur during the opening of intake valve 74. Still further in accordance with the present invention, the resultant high velocity/high pressure flow or injection of the air/fuel mixture through the intake valve guide body 78 is adapted to induce an increased flow of intake air through intake valve opening 86 and into the engine cylinder cavity 84.

Moreover, and as shown in FIG. 1, the intake port 81 of air manifold 82 is located and positioned relative to the engine intake valve 74 in a manner whereby air is drawn into the engine at a point below the nozzles 48 and the vaporized air/fuel mixture traveling through the valve guide body or sleeve 78 and nozzles 48 and is mixed with the intake air at a point adjacent and directly above the cylinder valve opening 86. Stated another way, the intake air is fed into the space defined between the distal end of the guide 78 where the air mixes with the air/fuel mixture being delivered through nozzles 48 and then directly therefrom through opening 86. In accordance with the present invention, mixing the intake air and fuel vapor at the opening 86 increases the volumetric efficiency of the engine by minimizing the distortion of the intake air which normally occurs when the fuel and intake air are mixed at a point upstream of the valve opening 86 while simultaneously advantageously avoiding a raise in the temperature of the intake air, i.e., an event which is normally adverse and detrimental to engine power output.

Moreover, in accordance with the present invention, the introduction and injection of the air/vapor fuel mixture with the intake manifold air at a point adjacent the outlet end of the intake port rather than at a point upstream of the manifold outlet offers the dual advantages of causing an increase in the flow rate of said intake air while simultaneously keeping the intake manifold air temperature low. The combination intake air/fuel vapor mixture is then introduced into cylinder 50 through valve opening 86, subsequently compressed therein, ignited and then combusted. The positive pressure vapor fuel injection and combustion process described above is adapted to complete one full cycle for each power stroke (i.e., intake, compression, power, exhaust) of the engine cylinder cycle.

It will be readily apparent from the foregoing detailed description of the invention and from the illustrations thereof that numerous variations and modifications may be effected without departing from the true spirit and scope of the novel concepts or principles of this invention.

I claim:

1. A positive pressure vapor fuel injection system comprising:

an air pump adapted to generate timed and metered charges of pre-heated air;

a fuel injector adapted to emit timed and metered charges of fuel, the charges of air being adapted to push the respective charges of fuel into a heat exchanger where the charges of fuel are converted into respective metered charges of fuel vapor;

an engine cylinder assembly including a fuel combustion chamber and an engine intake valve with a guide body defining nozzles through which the respective charges of fuel vapor are adapted to be delivered; and an air intake manifold operatively associated with the engine cylinder assembly and engine intake valve whereby air flowing through the air intake port of said air intake manifold is adapted to mix with the respective charges of fuel vapor at the point of entry into the fuel combustion chamber.

2. The positive pressure vapor fuel injection system of claim 1 wherein a timing belt operatively connects the air pump to an engine shaft.

3. The positive pressure vapor fuel injection system of claim 1 wherein a gear operatively connects the air pump to an engine shaft.

4. The positive pressure vapor fuel injection system of claim 1 wherein the heat exchanger comprises an elongate conduit wrapped around an engine exhaust conduit.

5. The positive pressure vapor fuel injection system of claim 1 further comprising a pressure relief control valve operatively associated and positioned between the heat exchanger and the fuel vapor delivery nozzle, the relief control valve being set at a relief pressure to allow respective injections of the fuel vapor charges to be timed approximately to the opening and closing of the engine intake valve.

6. The positive pressure vapor fuel injection system of claim 1 wherein the air pump is a timed axial pump with swash plate.

7. A positive pressure vapor fuel injection system adapted for use in connection with an engine including an air intake manifold operatively associated therewith and an intake valve having an intake valve guide associated therewith, the air intake manifold being positioned in a relationship wherein intake air traveling through the intake manifold is drawn into the engine at a point below the outlet of an intake valve guide injection nozzle associated with the intake valve guide, the fuel injection system comprising means for feeding timed charges of vaporized fuel through the body of said intake valve guide and subsequently mixing the charges of vaporized fuel with said intake air at the point adjacent the outlet of the body of said intake valve guide.

8. The positive pressure vapor fuel injection system of claim 7 wherein the means for vaporizing the fuel comprises:
an air pump adapted to generate timed charges of preheated air; and
a fuel injection assembly including a fuel injector adapted to generate timed charges of fuel and the air being adapted to push the respective timed charges of fuel out of the fuel injection assembly into a heat exchanger where the timed charges of fuel are converted into said charges of vaporized fuel.

9. The positive pressure vapor fuel injection system of claim 7 wherein a timing belt operatively connects the air pump to an engine shaft.

10. The positive pressure vapor fuel injection system of claim 7 further comprising a pressure relief control valve operatively associated and positioned between the heat exchanger and the intake valve guide injection nozzle, the relief control valve being set at a relief pressure to allow respective injections of the fuel vapor charges to be timed approximately to the opening and closing of the engine intake valve.

11. The positive pressure vapor fuel injection system of claim 7 further including a collar surrounding the body of said intake valve guide, said collar and said body of said intake valve guide defining bores in vapor flow communication and adapted to carry said charges of vaporized fuel through said intake valve guide injection nozzle.

12. A vapor fuel injection system adapted for delivering timed charges of fuel vapor into an engine including a plurality of cylinders, the system comprising:
a plurality of fuel injectors operatively associated with the engine cylinders respectively and adapted to emit timed charges of fuel;
an air pump including a plurality of air cylinders operatively dedicated to the plurality of fuel injectors and the plurality of engine cylinders respectively and adapted to produce timed charges of air,
a plurality of air delivery conduits extending between the air cylinders and fuel injectors respectively, the conduits being sized and adapted to increase the velocity and temperature of the air flowing therethrough;
a plurality of heat exchange conduits operatively associated with the plurality of fuel injectors respectively, the timed charges of air being adapted to push the respective timed charges of fuel into and through the heat exchange conduits respectively wherein the timed charges of fuel are converted into timed charges of fuel vapor;
a plurality of intake valve guide fuel vapor delivery nozzles operatively associated at one end with the plurality of heat exchange conduits respectively and at the other end with the engine cylinders respectively, each of the fuel vapor delivery nozzles being defined in respective intake valve guide bodies through which the respective timed charges of fuel vapor are adapted to flow;
a control relief valve operatively associated with each of the heat exchange conduits for controlling the pressure of the timed charges of fuel vapor; and
an air intake manifold operatively associated with the engine cylinders and adapted to deliver charges of intake air into the engine cylinders respectively, the air intake manifold including an air intake port and the fuel vapor delivery nozzles being positioned and oriented relative to one another whereby the timed charges of fuel vapor and intake air are mixed together at the point of entry into the respective engine cylinders.

13. The positive pressure vapor fuel injection system of claim 12 wherein a timing belt operatively connects the air pump to an engine shaft.

14. The vapor fuel injection system of claim 12 wherein a collar surrounds each of the intake valve guide bodies, the collar and the guide bodies respectively defining bores therein defining cooperating and interconnected passages for said timed charges of fuel vapor, said passages in said respective intake valve guide bodies terminating in said respective fuel vapor delivery nozzles, said fuel vapor being adapted to flow successively through said respective passages in said collar and said intake valve guide bodies and said fuel vapor delivery nozzles respectively.

15. In a vapor fuel injection system adapted for delivering timed charges of fuel vapor into an engine cylinder, the system including an intake valve having a guide body surrounded by a collar, the collar defining a first fuel vapor delivery passage in vapor flow communication with a second fuel vapor delivery passage extending through the guide body and terminating at the distal end of said guide body into a vapor fuel delivery nozzle.

16. The vapor fuel injection system of claim 15 wherein the collar has inner and outer circumferential surfaces and a body therebetween, said fuel vapor delivery passage in said collar being defined by a first bore extending radially inwardly into the collar from the outer surface thereof and a circumferential groove extending into the inner surface and in vapor flow communication with said first bore, said second fuel vapor delivery passage in said guide body of said intake valve being defined by a plurality of bores extending longitudinally therethrough between the groove in said collar and said distal end of said guide body.

17. The vapor fuel injection system of claim 16 wherein the plurality of bores extend through said guide body in a spaced-apart, parallel circumferential relationship.

\* \* \* \* \*